US012139960B2

(12) United States Patent
Wang

(10) Patent No.: US 12,139,960 B2
(45) Date of Patent: Nov. 12, 2024

(54) INTELLIGENT WINDOW ALLOWING VENTILATION

(71) Applicant: Jui-Wen Wang, Keelung (TW)

(72) Inventor: Jui-Wen Wang, Keelung (TW)

( * ) Notice: Subject to any disclaimer, the term of this patent is extended or adjusted under 35 U.S.C. 154(b) by 940 days.

(21) Appl. No.: 17/178,573

(22) Filed: Feb. 18, 2021

(65) Prior Publication Data

US 2022/0042368 A1 Feb. 10, 2022

(30) Foreign Application Priority Data

Aug. 6, 2020 (TW) ................................ 109126694

(51) Int. Cl.
*E06B 3/46* (2006.01)
*E05F 15/60* (2015.01)
*E06B 3/06* (2006.01)
*E06B 7/10* (2006.01)

(52) U.S. Cl.
CPC ............ *E06B 3/4618* (2013.01); *E05F 15/60* (2015.01); *E06B 3/06* (2013.01); *E06B 7/10* (2013.01)

(58) Field of Classification Search
CPC ........... E05Y 2201/22; E05Y 2201/406; E05Y 2400/32; E05Y 2400/61; E05Y 2400/612; E05Y 2400/628; E05Y 2400/656; E05Y 2900/148; E05Y 2400/854; E05Y 2800/75
USPC ........................................................... 49/449
See application file for complete search history.

(56) References Cited

U.S. PATENT DOCUMENTS 4,563,625 A * 1/1986 Kornbrekke ............ E05F 15/40 318/602
4,893,435 A * 1/1990 Shalit .................... E05F 15/643 49/449
5,301,734 A * 4/1994 Opel ...................... E05D 15/22 49/362
5,502,925 A * 4/1996 Gorrell ............... E05D 13/1207 49/449
5,581,944 A * 12/1996 Kornbrekke ............ E05F 15/42 49/27
5,595,026 A * 1/1997 Licking .................. E05F 15/57 49/360

(Continued)

FOREIGN PATENT DOCUMENTS

CN 113338779 A * 9/2021
CN 113756663 A * 12/2021

(Continued)

*Primary Examiner* — Jerry E Redman
(74) *Attorney, Agent, or Firm* — Winston Hsu

(57) ABSTRACT

An intelligent window allowing ventilation has an outer frame, a sliding frame, an upper locking rod, a lower locking rod, a driving module, a power supply module, and a switch assembly. The sliding frame is slidably mounted in the outer frame. The switch assembly controls the driving module to selectively drive the upper locking rod and the lower locking rod to two locking positions respectively, two ventilation positions respectively or two unlocking positions respectively. Since no handle is needed, an appearance of the intelligent window is neat and scenery outside the intelligent window would not be sheltered. In addition, by actuating the switch module to electrically drive the upper locking rod and the lower locking rod, a user is able to switch the intelligent window to a locked state, a ventilation state or a unlocked state. It is labor-saving and simple in operation.

20 Claims, 13 Drawing Sheets

(56) References Cited

U.S. PATENT DOCUMENTS

| | | | | | |
|---|---|---|---|---|---|
| 9,038,317 | B2 * | 5/2015 | Hansen | E05F 15/665 49/360 |
| 9,447,617 | B2 * | 9/2016 | Smith | E05C 17/56 |
| 9,562,371 | B2 * | 2/2017 | McCaslin | E05B 47/0046 |
| 2012/0192490 | A1 * | 8/2012 | Mccaslin | H04L 12/2827 49/31 |
| 2012/0192493 | A1 * | 8/2012 | Wolfe | E05B 65/08 292/341.19 |
| 2015/0159427 | A1 * | 6/2015 | Dutsch | E06B 5/113 49/449 |
| 2017/0074021 | A1 * | 3/2017 | Rodems | E05D 15/06 |
| 2018/0016827 | A1 * | 1/2018 | Newman | E05D 15/48 |
| 2018/0238097 | A1 * | 8/2018 | Plummer | E05F 15/643 |
| 2019/0309562 | A1 * | 10/2019 | Hall | E05F 15/643 |
| 2022/0333426 | A1 * | 10/2022 | Hall | E05F 15/665 |
| 2022/0416491 | A1 * | 12/2022 | Berner | E05D 15/16 |

FOREIGN PATENT DOCUMENTS

| | | | | | |
|---|---|---|---|---|---|
| DE | 20104378 | U1 * | 7/2002 | E05F 15/665 |
| FR | 3078357 | A1 * | 8/2019 | E05F 15/643 |
| KR | 20210088164 | A * | 7/2021 | |

* cited by examiner

INTELLIGENT WINDOW ALLOWING VENTILATION

CROSS-REFERENCE TO RELATED APPLICATIONS

This application is based upon and claims priority under 35 U.S.C. 119 from Taiwan Patent Application No. 109126694 filed on Aug. 6, 2020, which is hereby specifically incorporated herein by this reference thereto.

BACKGROUND OF THE INVENTION

1. Field of the Invention

The present invention relates to an intelligent window, especially to an intelligent window that can be switched to a locked state, a ventilation state, or an unlocked state by pressing switching buttons.

2. Description of the Prior Art(s)

Generally, casement windows and horizontal sliding windows are two main types of windows and the inventor of the present invention has designed a conventional horizontal planar sliding window. The conventional horizontal planar sliding window has an outer frame and two sliding sashes mounted in the outer frame. When the conventional horizontal planar sliding window is closed, the two sliding sashes are linearly arranged on the same plane. Thus, a junction of the two sliding sashes can be airtight. Moreover, when the conventional horizontal planar sliding window is closed, the sliding sashes can be locked at a specific position on the outer frame with an upper locking rod and a lower locking rod that are mounted in one of the two sliding sashes. The upper locking rod and the lower locking rod can be driven to move away from each other and protrude outward to engage with the outer frame, or move towards each other and being retracted to disengage from the outer frame.

However, when opening or closing the conventional horizontal planar sliding window, a user has to manually drive the upper locking rod and the lower locking rod trough a handle. The handle is mounted on and protrudes on an outer surface of the sliding sash in which the upper locking rod and the lower locking rod is mounted, and thus an appearance of the conventional horizontal planar sliding window is not neat and scenery outside the conventional horizontal planar sliding window is partially sheltered by the handle. Furthermore, people with less strength or shorter people may have difficulty in operating the handle. In addition, since each of the upper and lower locking rods is switched between a locking position and an unlocking position, it is unable to just break airtight seal between the two sliding sashes and limit sliding range of the two sliding sashes for indoor ventilation.

To overcome the shortcomings, the present invention provides an intelligent window allowing ventilation to mitigate or obviate the aforementioned problems.

SUMMARY OF THE INVENTION

The main objective of the present invention is to provide an intelligent window that allows ventilation. The intelligent window has an outer frame, a sliding frame, an upper locking rod, a lower locking rod, a driving module, a power supply module, and a switch assembly.

The outer frame has two transverse frame strips and is provided with two guiding blocks. An inner side surface of each transverse frame strip of the outer frame is provided with two guide rails and a baffle plate. Each guide rail has an opening end and a closing end. The baffle plate extends along an elongation direction of the transverse frame strip. The two guiding blocks are securely mounted on the inner side surfaces of the two transverse frame strips of the outer frame respectively and correspond in position to the closing end of one of the guide rails. Each guiding block is disposed between the baffle plate and a rear surface of a corresponding one of the transverse frame strips and is disposed apart from the baffle plate.

The sliding frame is slidably mounted in the outer frame and has two transverse frame strips and two side frame strips. The two side frame strips are slidable along the two guide rails of each transverse frame strip of the outer frame respectively. One of the side frame strips of the sliding frame is provided with at least one elastic abutting block. When the side frame strips move along the guide rails to the closing ends of the guide rails, the sliding frame is moved to a closed position and the at least one elastic abutting block tightly abuts against the outer frame.

The upper locking rod and the lower locking rod are mounted on one of the side frame strip of the sliding frame and arranged longitudinally. Each of the upper and lower locking rods is provided with a protruding tab.

The driving module is mounted on the sliding frame and includes a driving motor and a controller. The driving motor is connected to the upper locking rod and the lower locking rod. The controller is electrically connected to the driving motor and controls the driving motor to selectively drive the upper locking rod and the lower locking rod to linearly move away from each other or towards each other to two locking positions respectively, two ventilation positions respectively or two unlocking positions respectively. When being moved to the locking positions, each of the upper and lower locking rods is driven to protrude outward to be held between the baffle plate and the guiding block that are mounted on a corresponding one of the transverse frame strips of the outer frame. When being moved to the ventilation positions, each of the upper and lower locking rods is driven to be partially retracted into the sliding frame and abuts against a corresponding one of the guiding blocks. When being moved to the unlocking positions, each of the upper and lower locking rods is driven to be fully retracted into the sliding frame and disengage from the baffle plate and the guiding block.

The power supply module is electrically connected to the driving motor and the controller and provides electricity required for operation of the driving motor and the controller.

The switch assembly includes a position sensor module and a switch module. The position sensor module includes two micro switches and the two micro switches are separately mounted on the side frame strip of the sliding frame, on which the upper locking rod and the lower locking rod are mounted, is electrically connected to the controller and detects that the upper locking rod and the lower locking rod are located at the locking positions, the ventilation positions, or the unlocking positions. The switch module is mounted on the sliding frame and is electrically connected to the position sensor module and the controller. When the position sensor module detects that the upper locking rod and the lower locking rod are located at the locking positions, by actuating the switch module, the driving motor drives the upper locking rod and the lower locking rod to move towards each other to said unlocking positions or said ventilation positions. When the position sensor module 61 detects that the upper locking rod and the lower locking rod are located at the unlocking positions, by actuating the switch module, the driving motor drives the upper locking rod and the lower locking rod to move away from each other to said ventilation positions or said locking positions.

In the intelligent window, there are only the outer frame and the sliding frame and no handle is needed. Therefore, an appearance of the intelligent window is neat and scenery outside the intelligent window would not be sheltered. In addition, by actuating the switch module to electrically drive the upper locking rod and the lower locking rod, a user is able to switch the intelligent window to a locked state, a ventilation state or a unlocked state. It is labor-saving and simple in operation.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
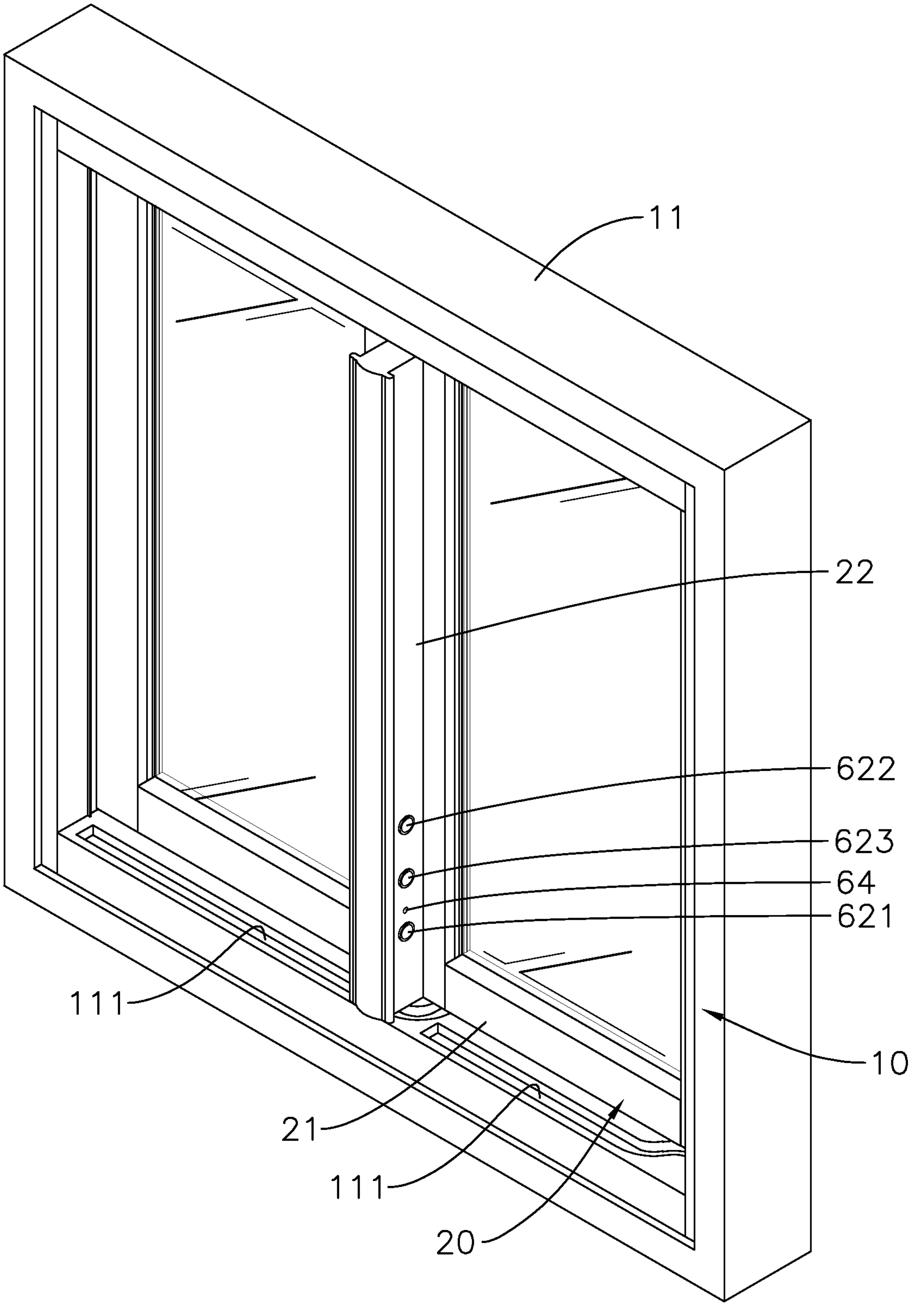
FIG. 1 is a perspective view of an intelligent window allowing ventilation in accordance with the present invention.
Figure 2:
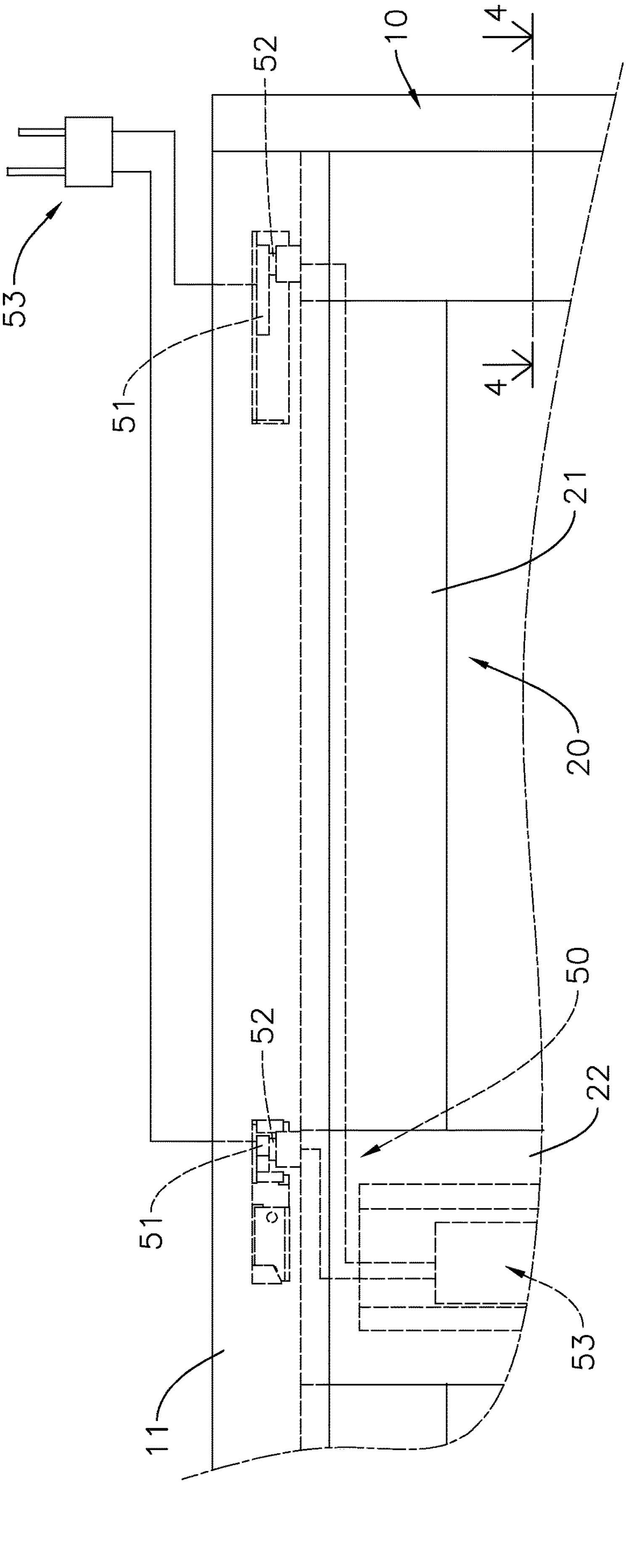
FIG. 2 is an enlarged schematic front view of an outer frame and a sliding frame of the intelligent window in FIG. 1.

With reference to FIGS. 1 to 3 and 5, take a horizontal planar sliding window for example, an intelligent window allowing ventilation in accordance with the present invention comprises an outer frame 10, a sliding frame 20, an upper locking rod 31, a lower locking rod 32, a driving module 40, a power supply module 50, and a switch assembly 60.

Figure 5A:
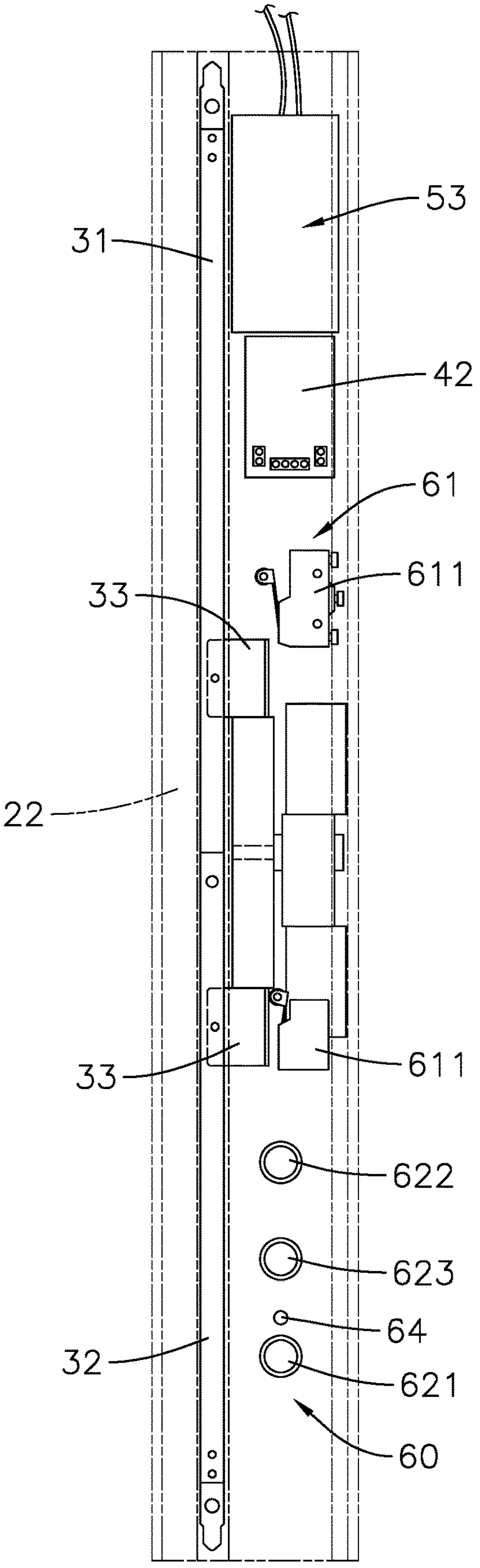
FIG. 5A is an enlarged schematic side view of the side frame strip of the sliding frame of the intelligent window in FIG. 1, showing an upper locking rod and a lower locking rod located at an unlocking position.
Figure 5B:
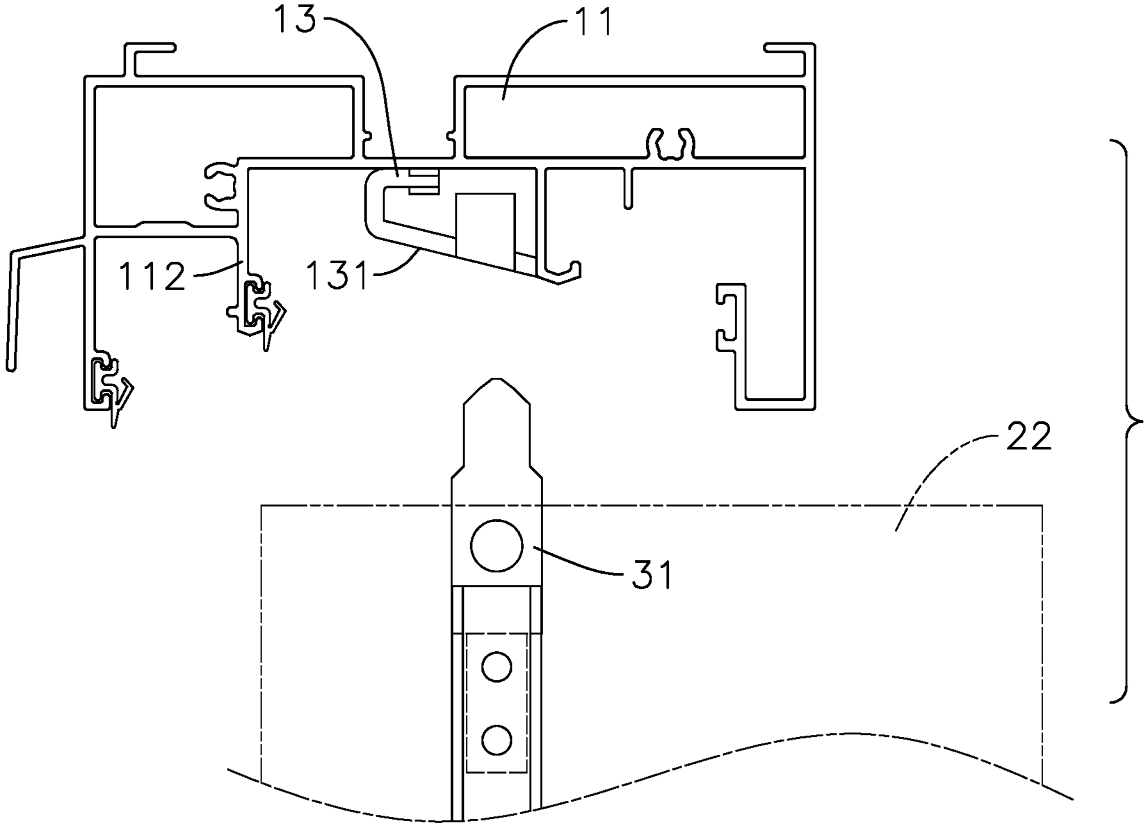
FIGS. 5B and 5C are enlarged schematic views of two transverse frame strips of the outer frame and the side frame strip of the sliding frame, showing the upper locking rod and the lower locking rod located at the unlocking position.
Figure 5C:
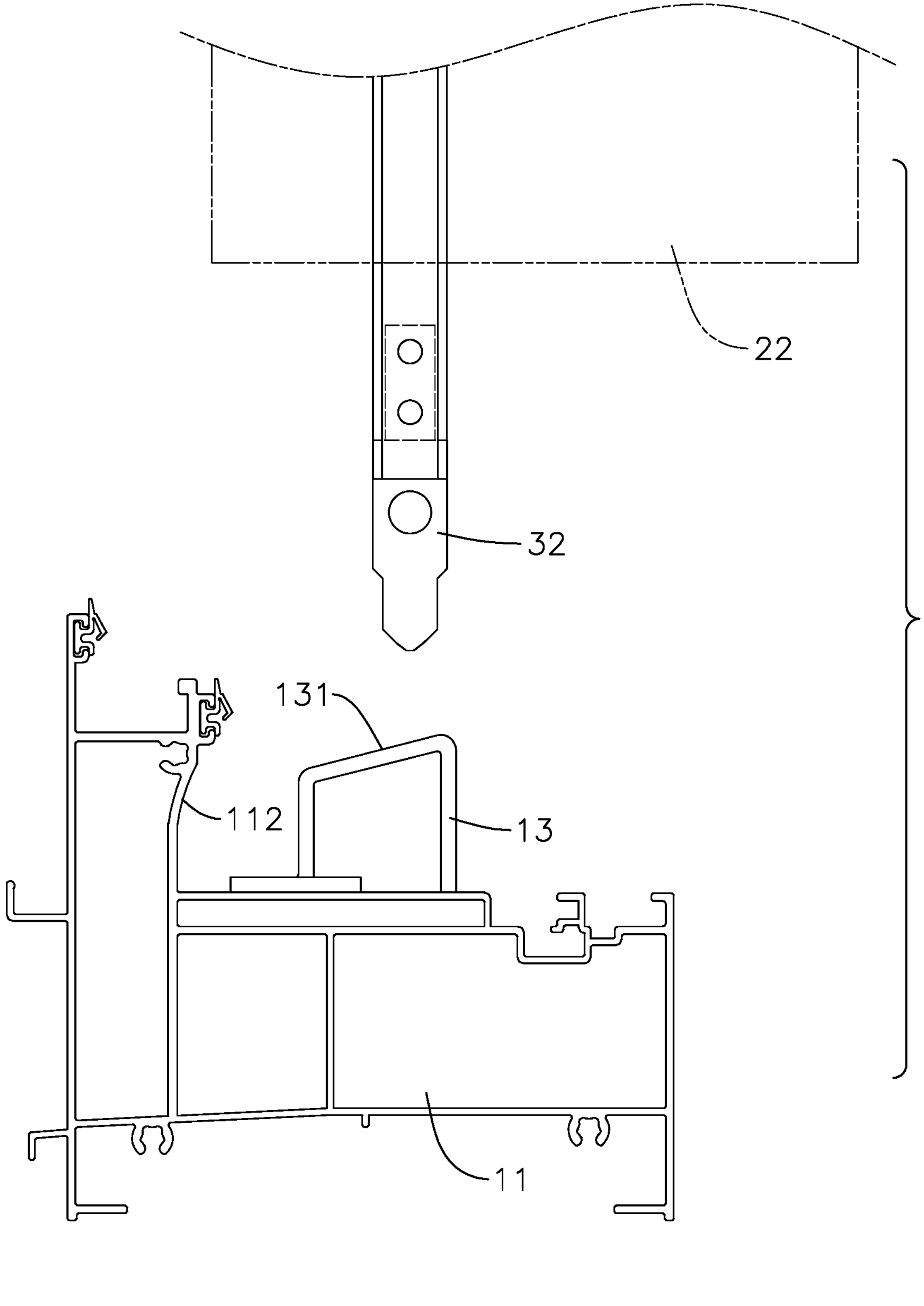

With further reference to FIGS. 5B and 5C, the outer frame 10 has two transverse frame strips 11 with one on top and one on bottom and is provided with two guiding blocks 13.

Each transverse frame strip 11 of the outer frame 10 has a front surface, a rear surface, and an inner side surface. The front surface faces toward an interior of a house. The rear surface faces toward an exterior of the house. The inner side surface faces toward the other transverse frame strip 11 of the outer frame 10. The inner side surface of each transverse frame strip 11 of the outer frame 10 is provided with two guide rails 111 and a baffle plate 112. Each guide rail 111 has an opening end and a closing end. The baffle plate 112 extends along an elongation direction of the transverse frame strip 11.

As shown in FIGS. 5B and 5C, the two guiding blocks 13 are securely mounted on middle positions of the inner side surfaces of the two transverse frame strips 11 of the outer frame 10 respectively and correspond in position to the closing end of one of the guide rails 111. Each guiding block 13 is disposed between the baffle plate 112 and the rear surface of a corresponding one of the transverse frame strips 11 and is disposed apart from the baffle plate 112. A height of the guiding block 13 decreases from a side that is disposed adjacent to the rear surface of the corresponding transverse frame strip 11 to another side that is disposed adjacent to the front surface of the corresponding transverse frame strip 11, such that an end surface of the guiding block 13, which faces toward the other transverse frame strip 11 of the outer frame 10, is formed as an inclined guide surface 131.

Figure 4:
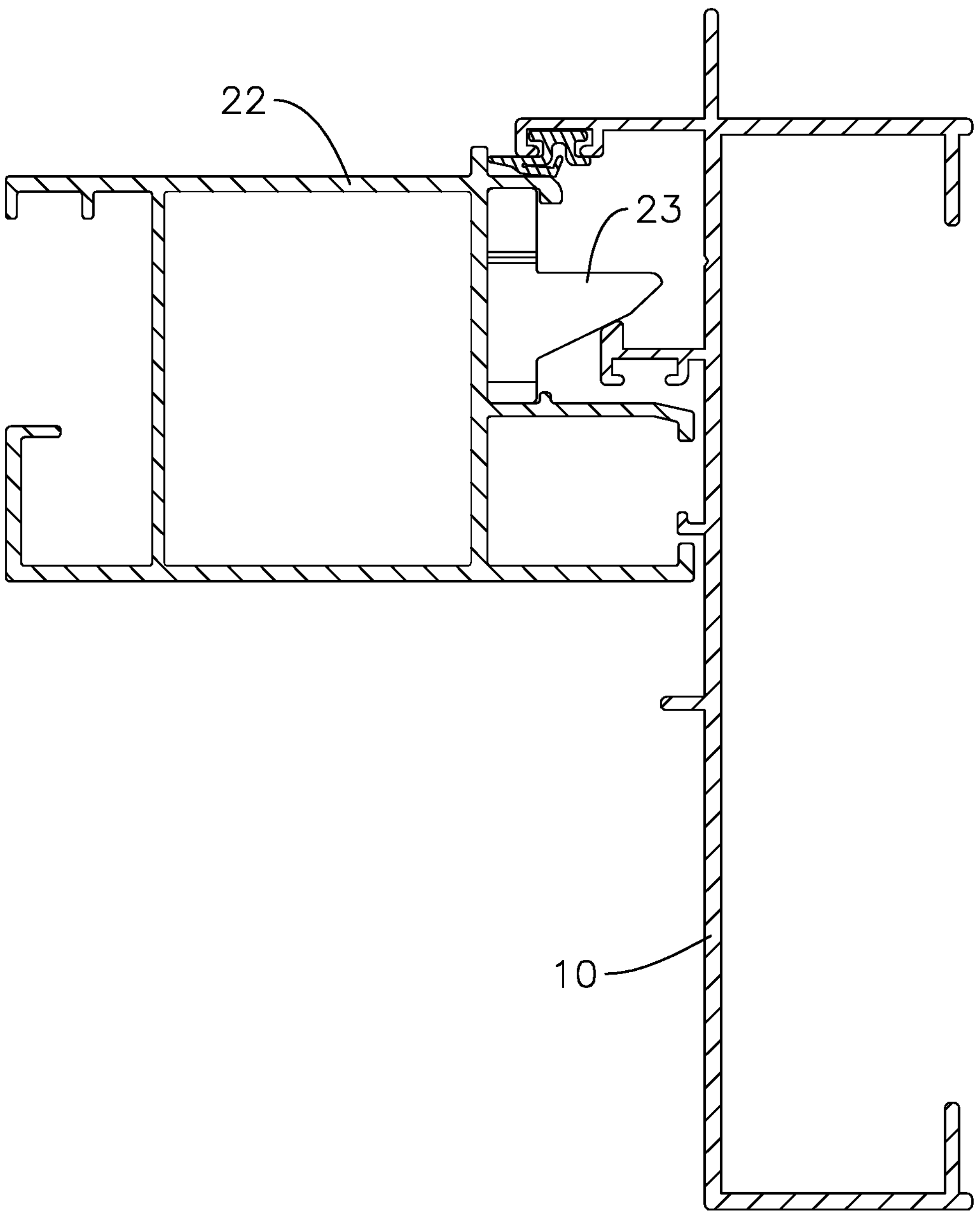
FIG. 4 is a cross-sectional view of the outer frame and the sliding frame of the intelligent window cutting along line 4-4 in FIG. 2.

The sliding frame 20 is slidably mounted in the outer frame 10 and has two transverse frame strips 21 with one on top and one on bottom and two side frame strips 22 with one on left and one on right. The two side frame strips 22 is slidable along the two guide rails 111 of each transverse frame strip 11 of the outer frame 10 respectively. With further reference to FIG. 4, one of the side frame strips 22 of the sliding frame 20 is provided with at least one elastic abutting block 23. When the side frame strips 22 move along the guide rails 111 to the closing ends of the guide rails 111, the sliding frame 20 is moved to a closed position and the at least one elastic abutting block 23 tightly abuts against the outer frame 10. When the side frame strips 22 move along the guide rails 111 to the opening ends of the guide rails 111, the sliding frame 20 is moved to an open position.

The upper locking rod 31 and the lower locking rod 32 are mounted on one of the side frame strip 22 of the sliding frame 20 and are arranged longitudinally. Each of the upper and lower locking rods 31, 32 is movable between a locking position, a ventilation position, and an unlocking position.

When the upper locking rod 31 and the lower locking rod 32 are moved to the locking positions, each of the upper and lower locking rods 31, 32 is driven to protrude outward to be held between the baffle plate 112 and the guiding block 13 that are mounted on a corresponding one of the transverse frame strips 11 of the outer frame 10, such that the sliding frame 20 is unable to move relative to the outer frame 10.

When the upper locking rod 31 and the lower locking rod 32 are moved to the ventilation positions, each of the upper and lower locking rods 31, 32 is driven to be partially retracted into the sliding frame 20 and abuts against the inclined guide surface 131 of a corresponding one of the guiding blocks 13, and the sliding frame 20 is still unable to move relative to the outer frame 10.

When the upper locking rod 31 and the lower locking rod 32 are moved to the unlocking positions, each of the upper and lower locking rods 31, 32 is driven to be fully retracted into the sliding frame 20 and disengage from the baffle plate 112 and the guiding block 13, such that the sliding frame 20 is able to move back and forth in the outer frame 10.

The driving module 40 is mounted on the sliding frame 20 and includes a driving motor 41 and a controller 42. The driving motor 41 is connected to the upper locking rod 31 and the lower locking rod 32. The controller 42 is electrically connected to the driving motor 41 and controls the driving motor 41 to selectively drive the upper locking rod 31 and the lower locking rod 32 to linearly move away from each other or towards each other. Specifically, the upper locking rod 31 and the lower locking rod 32 can be driven to move away from each other to the locking positions respectively, or move towards each other to the unlocking positions respectively. Specifically, the driving motor 41 may be a linear step motor.

The power supply module 50 is electrically connected to the driving motor 41 and the controller 42 and provides electricity required for operation of the driving motor 41 and the controller 42. A source of the electricity provided by the power supply module 50 may be solar energy, batteries, or household electricity.

In the preferred embodiment, the power supply module 50 is mounted on the outer frame 10 and the sliding frame 20 and includes two first conductive terminals 51, two second conductive terminals 52, and a power module 53. The two first conductive terminals 51 are separately mounted on one of the transverse frame strips 11 of the outer frame 10 and correspond in position to the closed position of the sliding frame 20. The two second conductive terminals 52 are separately mounted on one of the transverse frame strips 21 of the sliding frame 20. The transverse frame strip 21 of the sliding frame 20, which is mounted with the two second conductive terminals 52, overlaps with the transverse frame strip 11 of the outer frame 10, which is mounted with the two first conductive terminals 51. The power module 53 is electrically connected to the driving motor 41 and the controller 42 and is also electrically connected to the two first conductive terminals 51 and the two second conductive terminals 52. When the sliding frame 12 is moved to the closed position, the two second conductive terminals 52 electrically conduct the two first conductive terminals 51 respectively, so as to energize the power module 53 and to provide electric power to the driving motor 41 and the controller 42.

Figure 3:
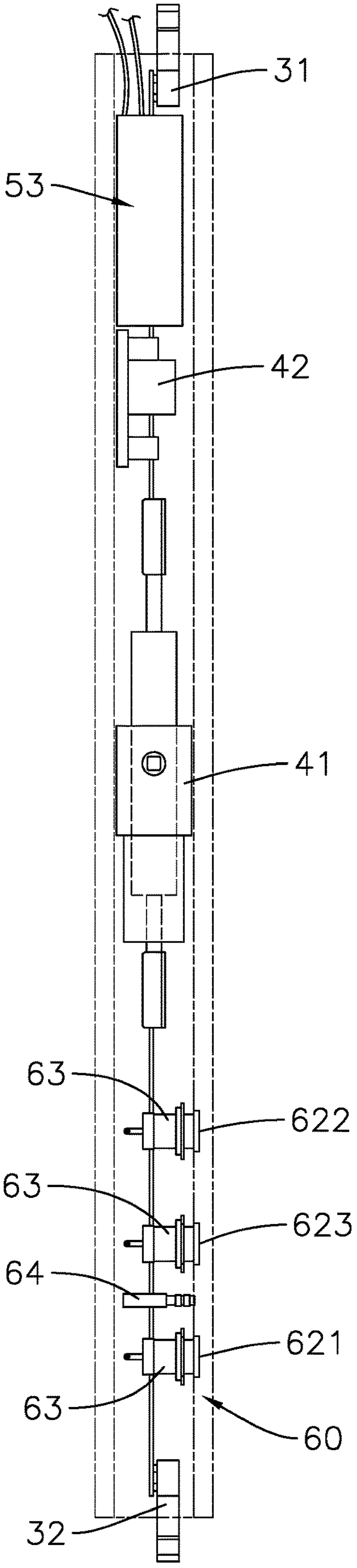
FIG. 3 is an enlarged schematic front view of a side frame strip of the sliding frame of the intelligent window in FIG. 1.

With further reference to FIGS. 3 and 5A, the switch assembly 60 includes a position sensor module 61 and a switch module 62. The position sensor module 61 is mounted on the side frame strip 22 of the sliding frame 20, on which the upper locking rod 31 and the lower locking rod 32 are mounted, is electrically connected to the controller 42, and detects that the upper locking rod 31 and the lower locking rod 32 are located at the locking positions, the ventilation positions, or the unlocking positions. The switch module 62 is mounted on the sliding frame 12 and is electrically connected to the position sensor module 61 and the controller 42.

When the position sensor module 61 detects that the upper locking rod 31 and the lower locking rod 32 are located at the locking positions, by actuating the switch module 62, the driving motor 41 drives the upper locking rod 31 and the lower locking rod 32 to move towards each other to said unlocking positions or said ventilation positions.

When the position sensor module 61 detects that the upper locking rod 31 and the lower locking rod 32 are located at the unlocking positions, by actuating the switch module 62, the driving motor 41 drives the upper locking rod 31 and the lower locking rod 32 to move away from each other to said ventilation positions or said locking positions.

In the preferred embodiment, the switch module 62 is, but not is limited to, mounted on the side frame strip 22 of the sliding frame 20. In other embodiments, the switch module 62 may be mounted on any one of the transverse frame strip 21 of the sliding frame 20 as long as the switch module 62 can be easily operated by the user.

In the preferred embodiment, each of the upper and lower locking rods 31, 32 is provided with a protruding tab 33, the position sensor module 61 includes two micro switches 611, and the switch module 62 includes a lock button 621, an unlock button 622 and a ventilation button 623. The two micro switches 611 are separately mounted on the side frame strip 22 of the sliding frame 20, on which the upper locking rod 31 and the lower locking rod 32 are mounted. The lock button 621, the unlock button 622, and the ventilation button 623 are mounted on the side frame strip 22 of the sliding frame 20, on which the upper locking rod 31 and the lower locking rod 32 are mounted, are spaced at intervals, and are electrically connected to the controller 42. The lock button 621 and the unlock button 622 are electrically connected to the two micro switches 611 respectively.

Figure 6A:
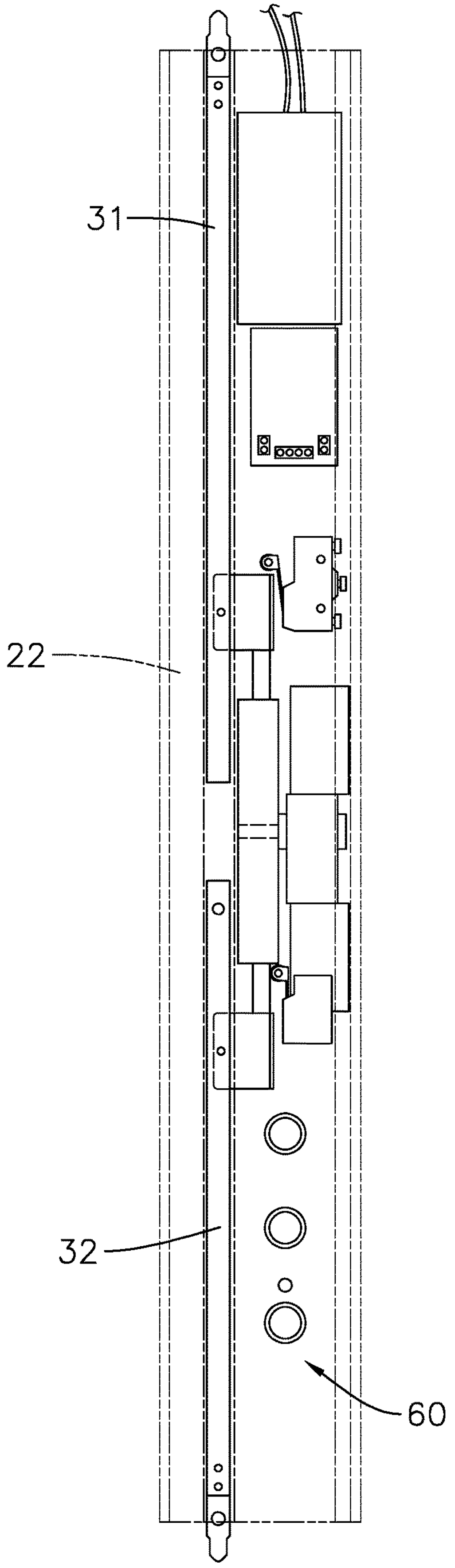
FIG. 6A is an enlarged schematic side view of the side frame strip of the sliding frame of the intelligent window in FIG. 1, showing the upper locking rod and the lower locking rod located at a ventilation position.
Figure 6B:
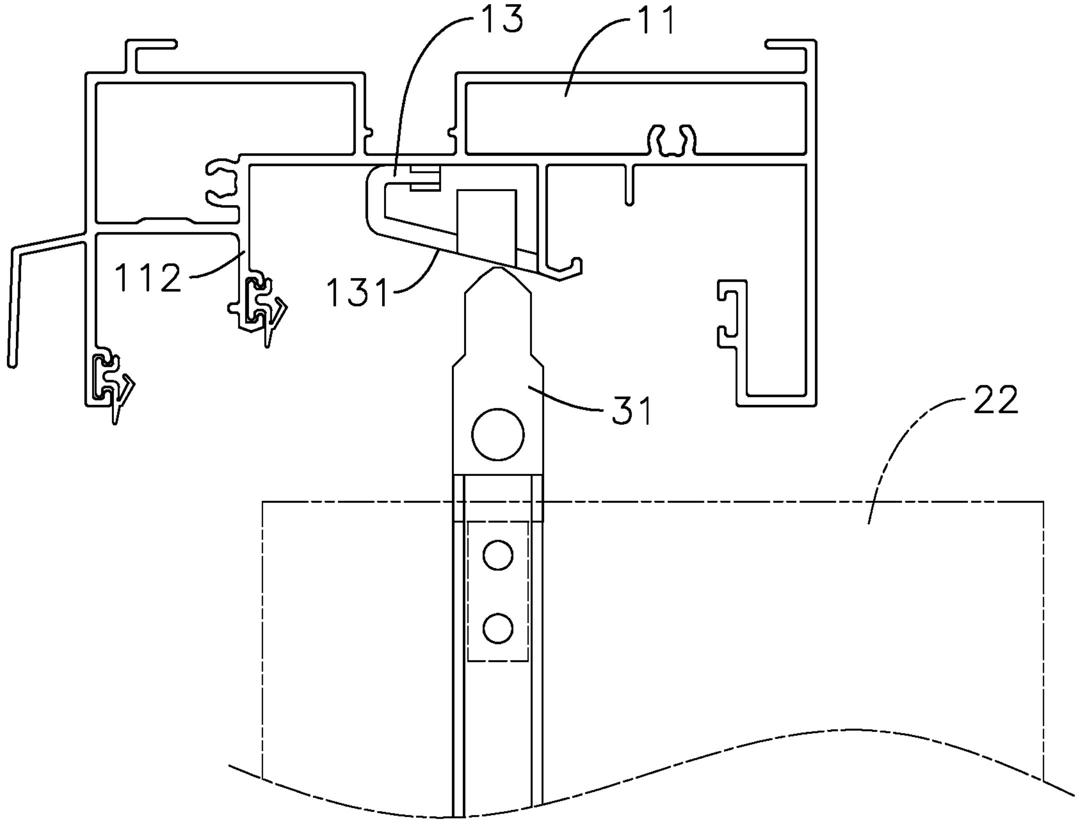
FIGS. 6B and 6C are enlarged schematic views of two transverse frame strips of the outer frame and the side frame strip of the sliding frame, showing the upper locking rod and the lower locking rod located at the ventilation position.
Figure 6C:
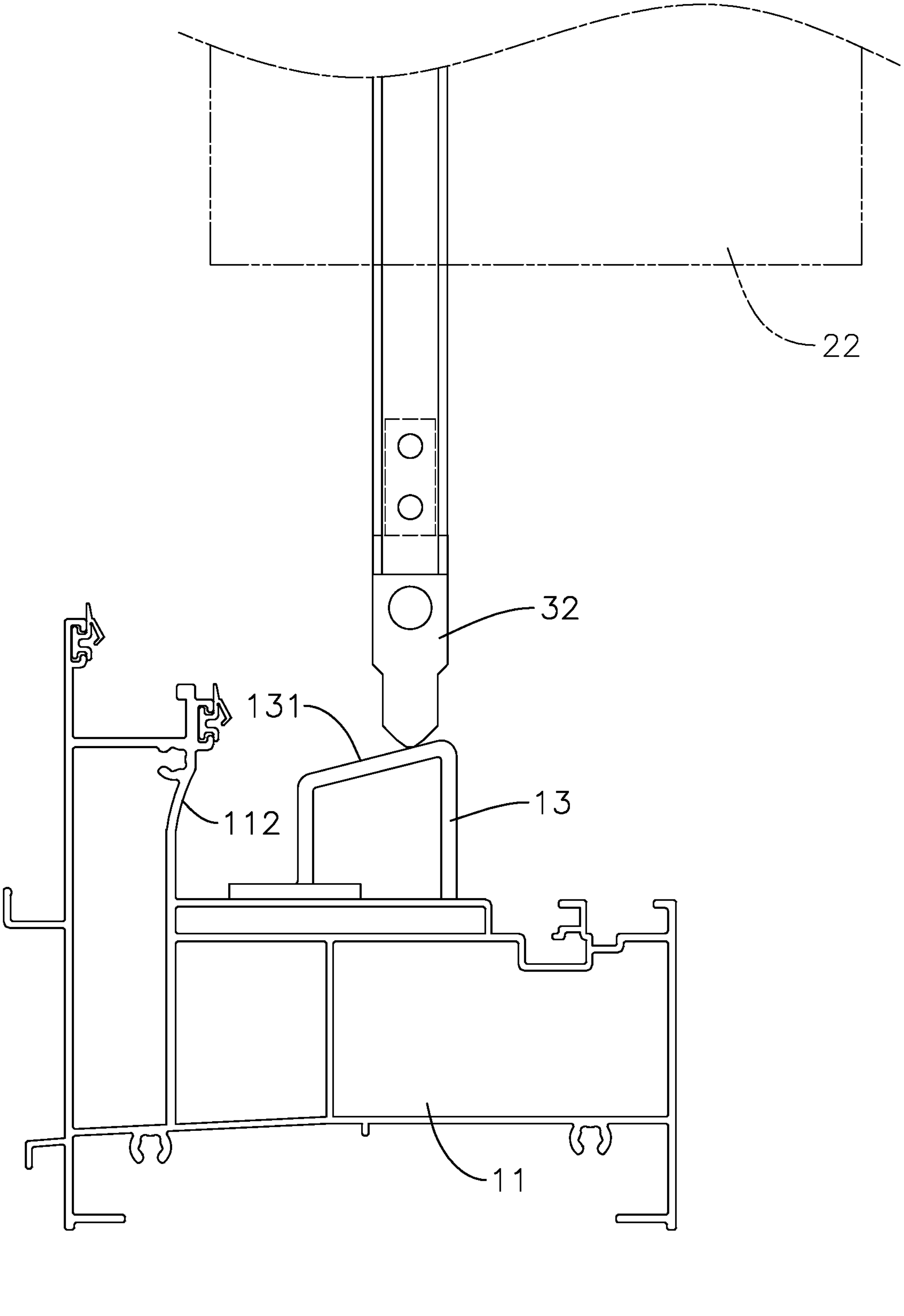

With reference to FIGS. 5A to 5C, the upper locking rod 31 and the lower locking rod 32 are located at the unlocking positions. With further reference to FIGS. 6A to 6C, when the user presses the ventilation button 623, the controller 42 actuates the driving motor 41 to drive the upper locking rod 31 and the lower locking rod 32 to move away from each other to the ventilation position, and then the upper locking rod 31 and the lower locking rod 32 abut against the inclined guide surfaces 131 of the two guiding blocks 13 respectively. Thus the sliding frame 20 is not closed completely and is unable to further move relative to the outer frame 10. The intelligent window of the present invention is in a ventilation state.

Figure 7A:
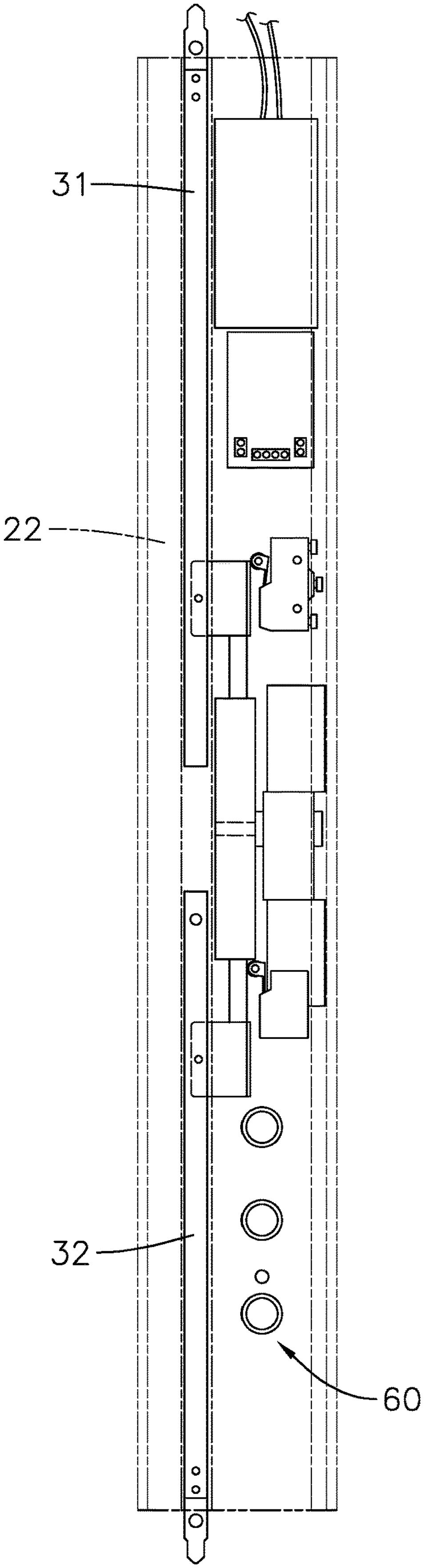
FIG. 7A is an enlarged schematic side view of the side frame strip of the sliding frame of the intelligent window in FIG. 1, showing the upper locking rod and the lower locking rod located at a locking position.
Figure 7B:
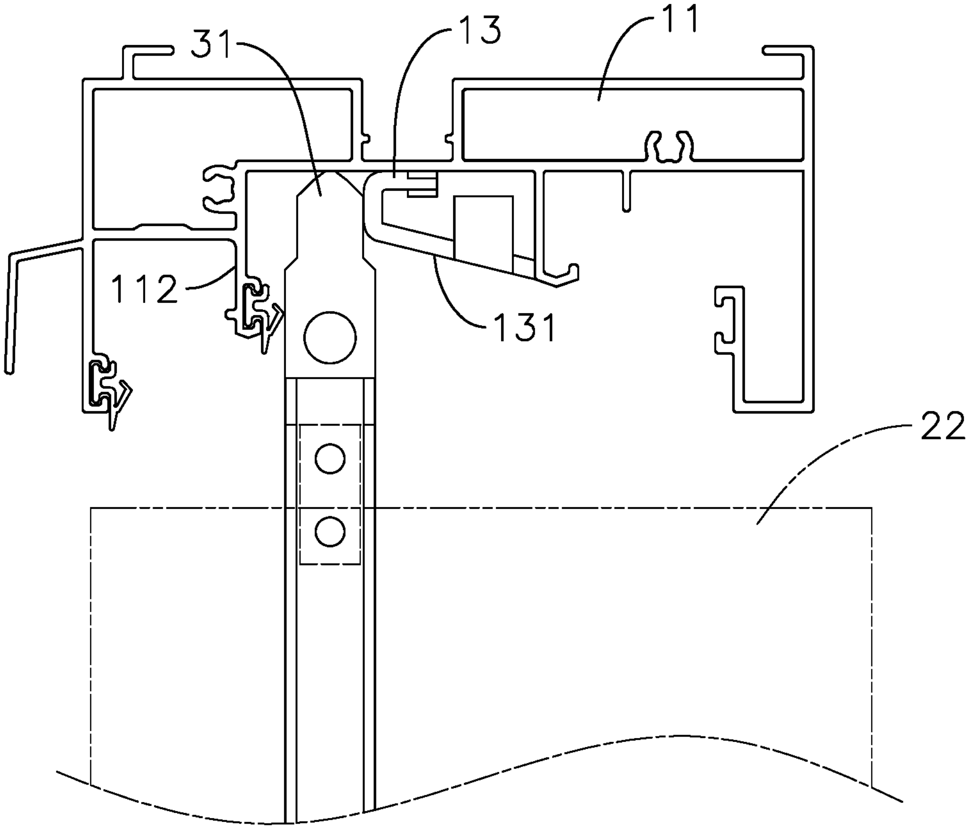
FIGS. 7B and 7C are enlarged schematic views of two transverse frame strips of the outer frame and the side frame strip of the sliding frame, showing the upper locking rod and the lower locking rod located at the locking position.
Figure 7C:
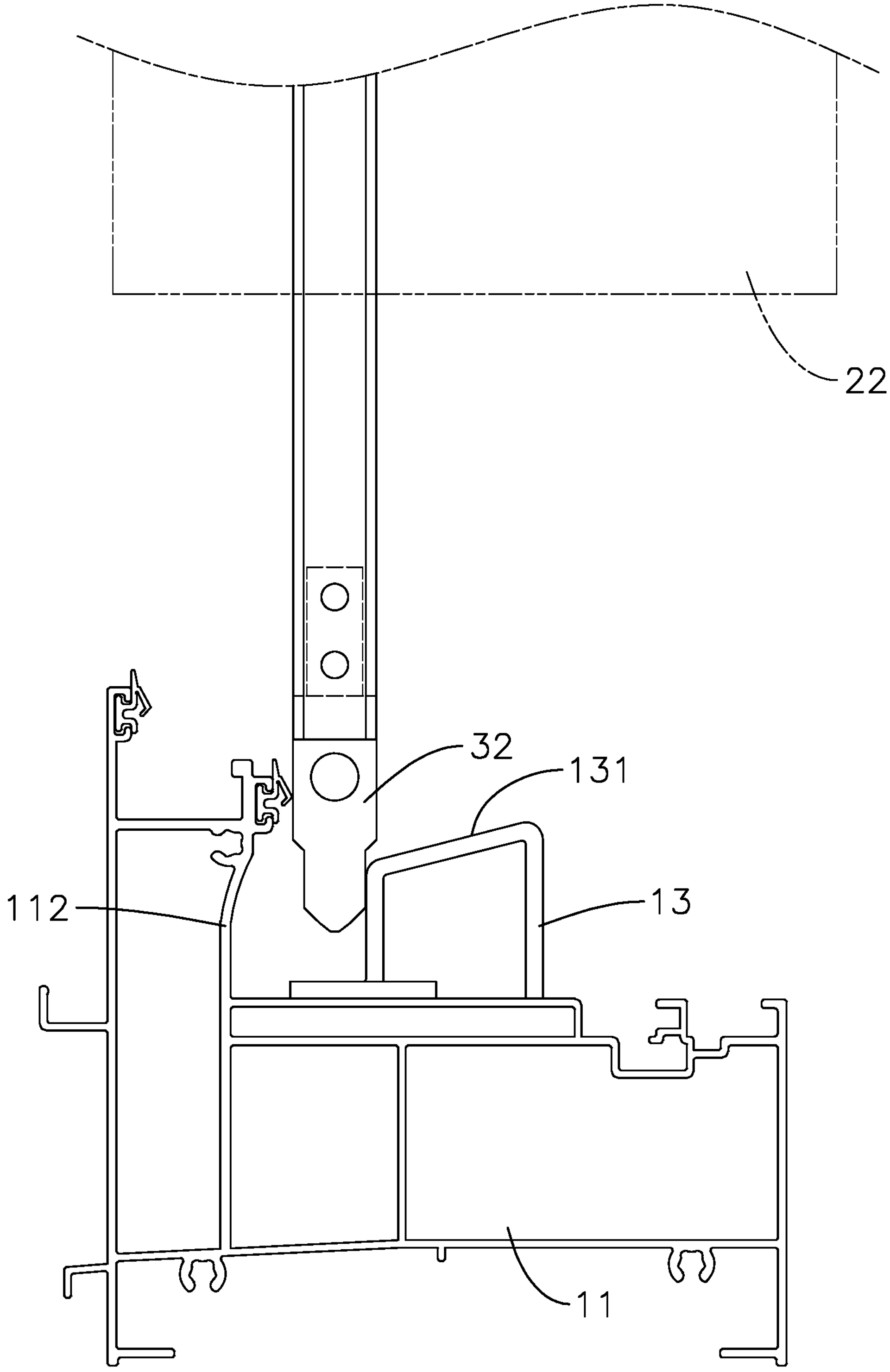

With further reference to FIGS. 7A to 7C, when the user presses the lock button 621, the controller 42 actuates the driving motor 41 to keep driving the upper locking rod 31 and the lower locking rod 32 to move away from each other and slide along the inclined guide surfaces 131 of the two guiding blocks 13 to the locking position. Thus, each of the upper and lower locking rods 31, 32 protrudes to be held between the baffle plate 112 and the guiding block 13 that are mounted on the corresponding one of the transverse frame strips 11 of the outer frame 10, such that the sliding frame 20 is unable to move relative to the outer frame 10.

With reference to FIGS. 7A to 7C, the upper locking rod 31 and the lower locking rod 32 are located at the locking positions. With further reference to FIGS. 6A to 6C, when the user presses the ventilation button 623, the controller 42 actuates the driving motor 41 to drive the upper locking rod 31 and the lower locking rod 32 to move towards each other to the ventilation position. With push of the at least one elastic abutting block 23 pushes the sliding frame 20, the upper locking rod 31 and the lower locking rod 32 abut against the inclined guide surfaces 131 of the two guiding blocks 13 respectively. Thus the sliding frame 20 is not closed completely and is unable to further move relative to the outer frame 10.

With further reference to FIGS. 5A to 5C, when the user presses the unlock button 621, the controller 42 actuates the driving motor 41 to keep driving the upper locking rod 31 and the lower locking rod 32 to be fully retracted into the sliding frame 20 and disengage from the baffle plates 112 and the guiding blocks 13.

Furthermore, the lock button 621, the unlock button 622 and the ventilation button 623 may be provided with indication lights 63 respectively. The indication lights 63 are electrically connected to a proximity sensor 64 that is mounted on the sliding frame 20. The indication lights 63 and the proximity sensor 64 are all electrically connected to the power module 53. When the proximity sensor 64 detects an approaching object, the proximity sensor 64 turns on the indication lights 63 to allow the user to identify positions and types of the lock button 621, the unlock button 622 and the ventilation button 623. This is especially helpful to identify those buttons at night. Preferably, the proximity sensor 64 is also mounted on the side frame strip 22 of the sliding frame 20, on which the upper locking rod 31 and the lower locking rod 32 are mounted, and is disposed around the lock button 621, the unlock button 622 and the ventilation button 623.

Preferably, when the indication lights 63 are turned on, the indication lights 63 emit lights of different colors at the lock button 621, the unlock button 622 and the ventilation button 623, so at to allow the user to easily identify the types of the lock button 621, the unlock button 622 and the ventilation button 623.

Moreover, in addition to be actuated through physical buttons such as the lock button 621, the unlock button 622 and the ventilation button 623, the switch module 62 may also controlled through a remote control or a mobile application, so as to switch the intelligent window to a locked state, the ventilation state or an unlocked state via remote control.

The intelligent window in accordance with the present invention as described has the following advantages. Since there are only the outer frame 10 and the sliding frame 20 and no handle is needed, an appearance of the intelligent window is neat and scenery outside the intelligent window would not be sheltered. In addition, by actuating the switch module 62 to electrically drive the upper locking rod 31 and the lower locking rod 32, the user is able to switch the intelligent window to the locked state, the ventilation state or the unlocked state. It is labor-saving and simple in operation.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An intelligent window allowing ventilation and comprising:

an outer frame having two transverse frame strips and provided with two guiding blocks, an inner side surface of each transverse frame strip of the outer frame provided with two guide rails and a baffle plate, each guide rail having an opening end and a closing end, the baffle plate extending along an elongation direction of the transverse frame strip, the two guiding blocks securely mounted on the inner side surfaces of the two transverse frame strips of the outer frame respectively and corresponding in position to the closing end of one of the guide rails, and each guiding block disposed between the baffle plate and a rear surface of a corresponding one of the transverse frame strips and disposed apart from the baffle plate;

a sliding frame slidably mounted in the outer frame and having two transverse frame strips and two side frame strips, the two side frame strips being slidable along the two guide rails of each transverse frame strip of the outer frame respectively, and one of the side frame strips of the sliding frame provided with at least one elastic abutting block, wherein when the side frame strips move along the guide rails to the closing ends of the guide rails, the sliding frame is moved to a closed position and the at least one elastic abutting block abuts against the outer frame;

an upper locking rod and a lower locking rod mounted on one of the side frame strip of the sliding frame and arranged longitudinally, and each of the upper and lower locking rods provided with a protruding tab;

a driving module mounted on the sliding frame and including a driving motor and a controller, the driving motor connected to the upper locking rod and the lower locking rod, and the controller electrically connected to the driving motor and controlling the driving motor to selectively drive the upper locking rod and the lower locking rod to linearly move away from each other or towards each other to two locking positions respectively, two ventilation positions respectively or two unlocking positions respectively, wherein:

when being moved to the locking positions, each of the upper and lower locking rods is driven to protrude outward to be held between the baffle plate and the guiding block that are mounted on a corresponding one of the transverse frame strips of the outer frame;

when being moved to the ventilation positions, each of the upper and lower locking rods is driven to be partially retracted into the sliding frame and abuts against a corresponding one of the guiding blocks; and when being moved to the unlocking positions, each of the upper and lower locking rods is driven to be fully retracted into the sliding frame and disengage from the baffle plate and the guiding block;

a power supply module electrically connected to the driving motor and the controller and providing electricity required for operation of the driving motor and the controller; and a switch assembly including a position sensor module including two micro switches, and the two micro switches separately mounted on the side frame strip of the sliding frame, on which the upper locking rod and the lower locking rod are mounted, electrically connected to the controller and detecting that the upper locking rod and the lower locking rod are located at the locking positions, the ventilation positions, or the unlocking positions; and a switch module mounted on the sliding frame and electrically connected to the position sensor module and the controller, wherein:

when the position sensor module detects that the upper locking rod and the lower locking rod are located at the locking positions, by actuating the switch module, the driving motor drives the upper locking rod and the lower locking rod to move towards each other to said unlocking positions or said ventilation positions; and when the position sensor module detects that the upper locking rod and the lower locking rod are located at the unlocking positions, by actuating the switch module, the driving motor drives the upper locking rod and the lower locking rod to move away from each other to said ventilation positions or said locking positions.

2. The intelligent window as claimed in claim 1, wherein a height of the guiding block decreases from a side that is disposed adjacent to the rear surface of the corresponding transverse frame strip to another side that is disposed adjacent to a front surface of the corresponding transverse frame strip, such that an end surface of the guiding block, which faces toward the other transverse frame strip of the outer frame, is formed as an inclined guide surface.

3. The intelligent window as claimed in claim 2, wherein the power supply module is mounted on the outer frame and the sliding frame and includes:

two first conductive terminals separately mounted on one of the transverse frame strips of the outer frame;

two second conductive terminals separately mounted on one of the transverse frame strips of the sliding frame; and a power module electrically connected to the driving motor, the controller, the two first conductive terminals, and the two second conductive terminals, wherein when the sliding frame is moved to the closed position, the two second conductive terminals electrically conduct the two first conductive terminals respectively.

4. The intelligent window as claimed in claim 3, wherein the switch module includes a lock button, an unlock button and a ventilation button, the lock button, the unlock button and the ventilation button are mounted on the side frame strip of the sliding frame, on which the upper locking rod and the lower locking rod are mounted, are spaced at intervals and are electrically connected to the controller, and the lock button and the unlock button are electrically connected to the two micro switches respectively.

5. The intelligent window as claimed in claim 3, wherein the lock button, the unlock button and the ventilation button are provided with indication lights respectively, the indication lights are electrically connected to a proximity sensor, and the indication lights and the proximity sensor are electrically connected to the power module, wherein when the proximity sensor detects an approaching object, the proximity sensor turns on the indication lights.

6. The intelligent window as claimed in claim 5, wherein when the indication lights are turned on, the indication lights emit lights of different colors at the button, the unlock button and the ventilation button.

7. The intelligent window as claimed in claim 3, wherein the driving motor is a linear step motor.

8. The intelligent window as claimed in claim 2, wherein the switch module includes a lock button, an unlock button and a ventilation button, the lock button, the unlock button and the ventilation button are mounted on the side frame strip of the sliding frame, on which the upper locking rod and the lower locking rod are mounted, are spaced at intervals and are electrically connected to the controller, and the lock button and the unlock button are electrically connected to the two micro switches respectively.

9. The intelligent window as claimed in claim 2, wherein the lock button, the unlock button and the ventilation button are provided with indication lights respectively, the indication lights are electrically connected to a proximity sensor, and the indication lights and the proximity sensor are electrically connected to the power module, wherein when the proximity sensor detects an approaching object, the proximity sensor turns on the indication lights.

10. The intelligent window as claimed in claim 9, wherein when the indication lights are turned on, the indication lights emit lights of different colors at the button, the unlock button and the ventilation button.

11. The intelligent window as claimed in claim 2, wherein the driving motor is a linear step motor.

12. The intelligent window as claimed in claim 1, wherein the power supply module is mounted on the outer frame and the sliding frame and includes:

two first conductive terminals separately mounted on one of the transverse frame strips of the outer frame;

two second conductive terminals separately mounted on one of the transverse frame strips of the sliding frame; and a power module electrically connected to the driving motor, the controller, the two first conductive terminals, and the two second conductive terminals, wherein when the sliding frame is moved to the closed position, the two second conductive terminals electrically conduct the two first conductive terminals respectively.

13. The intelligent window as claimed in claim 12, wherein the switch module includes a lock button, an unlock button and a ventilation button, the lock button, the unlock button and the ventilation button are mounted on the side frame strip of the sliding frame, on which the upper locking rod and the lower locking rod are mounted, are spaced at intervals and are electrically connected to the controller, and the lock button and the unlock button are electrically connected to the two micro switches respectively.

14. The intelligent window as claimed in claim 12, wherein the lock button, the unlock button and the ventilation button are provided with indication lights respectively, the indication lights are electrically connected to a proximity sensor, and the indication lights and the proximity sensor are electrically connected to the power module, wherein when the proximity sensor detects an approaching object, the proximity sensor turns on the indication lights.

15. The intelligent window as claimed in claim 14, wherein when the indication lights are turned on, the indication lights emit lights of different colors at the button, the unlock button and the ventilation button.

16. The intelligent window as claimed in claim 12, wherein the driving motor is a linear step motor.

17. The intelligent window as claimed in claim 1, wherein the switch module includes a lock button, an unlock button and a ventilation button, the lock button, the unlock button and the ventilation button are mounted on the side frame strip of the sliding frame, on which the upper locking rod and the lower locking rod are mounted, are spaced at intervals and are electrically connected to the controller, and the lock button and the unlock button are electrically connected to the two micro switches respectively.

18. The intelligent window as claimed in claim 1, wherein the lock button, the unlock button and the ventilation button are provided with indication lights respectively, the indication lights are electrically connected to a proximity sensor, and the indication lights and the proximity sensor are electrically connected to the power module, wherein when the proximity sensor detects an approaching object, the proximity sensor turns on the indication lights.

19. The intelligent window as claimed in claim 18, wherein when the indication lights are turned on, the indication lights emit lights of different colors at the button, the unlock button and the ventilation button.

20. The intelligent window as claimed in claim 1, wherein the driving motor is a linear step motor.

* * * * *